United States Patent [19]
Miura

[11] 3,767,534
[45] Oct. 23, 1973

[54] RECYCLE TYPE, CONTINUOUS PROCESS FOR FERMENTATION BASED ON APPLICATION OF MIXED CULTURING PRINCIPLE

[76] Inventor: Yoshiharu Miura, 8-28 Katagiri-cho, Ibaragi, Japan

[22] Filed: Oct. 21, 1971

[21] Appl. No.: 191,432

[30] Foreign Application Priority Data
Oct. 26, 1970 Japan.................................. 45/94209

[52] U.S. Cl.................. 195/115, 195/111, 195/140
[51] Int. Cl. .......................... C12b 1/00, C12b 1/20
[58] Field of Search....................... 195/115, 111, 1, 195/104, 147, 422

[56] References Cited
UNITED STATES PATENTS
3,489,648  1/1970  Wegner............................... 195/111
3,674,640  7/1972  Takeda et al........................ 195/115

Primary Examiner—Alvin E. Tanenholtz
Attorney—Joseph M. Fitzpatrick et al.

[57] ABSTRACT

A continuous process for fermentation of mixed cultures of microorganisms includes inoculating at least two fermentation tanks with different types of microorganisms and recycling the culture liquors between the tanks. Fermentation products are recovered at intermediate stations in the recycling system.

11 Claims, 1 Drawing Figure

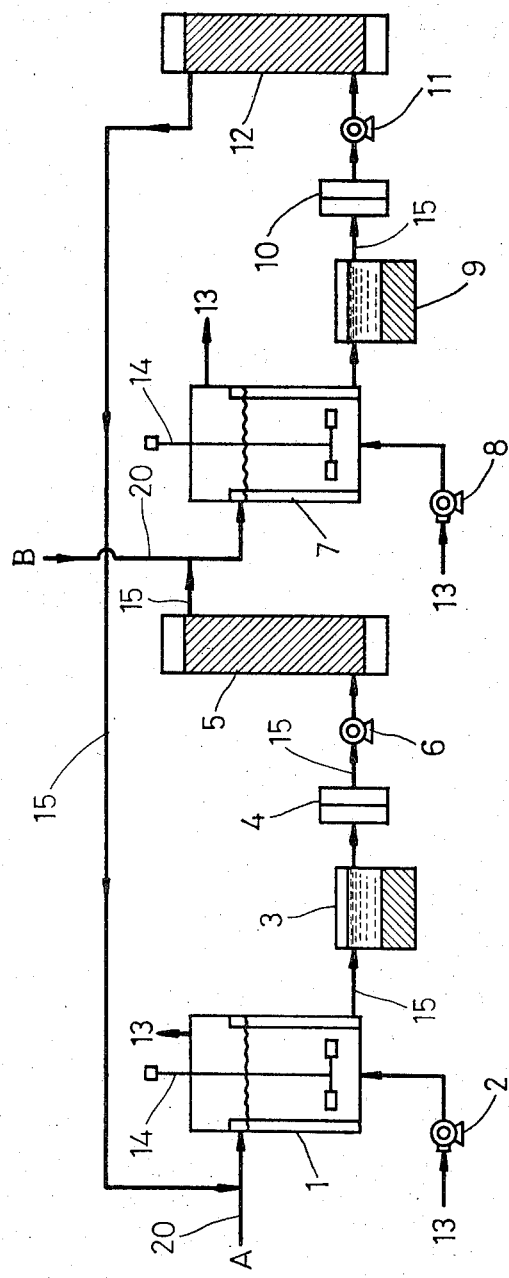

3,767,534

RECYCLE TYPE, CONTINUOUS PROCESS FOR FERMENTATION BASED ON APPLICATION OF MIXED CULTURING PRINCIPLE

BACKGROUND OF THE INVENTION

In the fermentation industry, it is well known that unicellular protein may be obtained through propagation of cells by carrying out fermentation using hydrocarbons or carbohydrates as an assimilable source. Moreover, enzymes, amino acids, vitamins, organic acids or other useful substances of metabolic products of the microorganisms are recoverable from the fermentation culture liquor. Recently, it has been found that when yeasts or molds are subjected to mixed culturing with bacteria, the rates of propagation of the respective microorganisms are significantly increased; and the optimum temperature for culturing the yeasts or the molds, which is usually more or less 30°C, is elevated to about 37°C which is optimum for the bacteria. In addition, the kinds of the metabolic products of the fermentation system are also significantly increased. In my U.S. Application Ser. No. 147,422, filed May 27, 1971, I have disclosed a process for fermentation by mixed culturing where the amount of cooling water for the fermenter is saved, which has been one of the important problems in the profit margin in the fermentation industry; and, at the same time, the range of assimilable carbon sources is increased and the rates of yields of microorganism cells and of the fermentation products are also increased.

Heretofore, in carrying out mixed culturing, it has been the ordinary procedure to inoculate yeasts or molds together with bacteria in one fermenter and carrying out fermentation until the desired end products are realized. However, when only one kind of cells, for example, only yeast protein is desired or when only a specific metabolic product of the microorganisms is desired, it must be separated from the culture liquor; and as a result, complicated and time consuming operations and apparatus are necessary.

SUMMARY OF THE INVENTION

Accordingly, the present invention is proposed to eliminate the aforementioned disadvantages. In accordance herewith, a process is disclosed which includes the employment of at least two interconnected ferementation tanks forming a closed system. One group of microorganisms, for example, bacteria, is cultured in a first fermenter in a medium having hydrocarbons or carbohydrates as an assimilable source. When the specific growth rate of the employed microorganisms reaches the maximum, the cells and precipitates are separated from the culture liquor by ordinary well known means, and the resulting liquor is introduced into a second fermenter previously charged and inoculated with other microorganisms, for example, yeasts or molds. As to the term "specific growth fate," reference is made to S. Aiba, A. E. Humphrey and N. F. Millis: "Biochemical Engineering," University of Tokyo Press, Tokyo, Japan, 1965, page 102. Thereafter the culture liquor is separated and is then recycled continuously from one fermenter to another. Further, during the culturing, the fresh media are properly supplied to the respective fermenters so that each medium concentration may be maintained constant. The feed and effluent rates of the culture liquors including said fresh media to or from the respective fermenters vary depending upon employed microorganisms, employed media and other culturing conditions, but such rates as to make the dilution ratio $0.2 - 0.4$ hour $^{-1}$ are preferable. As a result of said recycle type, continuous fermentation, an increase in the rates of propagation and fermentation and an elevation of the optimum culturing temperature have been obtained. Of course, in practice, both fermenters are intially charged with medium and the resulting liquor is transferred from one to the other. Such effects as saving in the amount of cooling water, enlargement of the range of assimilable carbon sources, and increase in yields of cells and fermentation products, are obtained. Furthermore, according to the present recycle type fermentation process, any desired substance may be recovered in a facile manner at any location in the recycle system without using complicated separating means and without mixing different kinds of cells or metabolic products. In the fermentation mechanism of the invention, substances capable of influencing propagation of other microorganisms are produced and dissolved respectively in the culture liquors of the bacteria, yeasts and molds thereby accomplishing the desired results of mixed culturing. As a further advantage, there is no loss of culture liquor and, therefore, the present invention serves to negate any possibility of contamination of natural resources by run-off.

It is to be understood that the present recycle type continuous fementation process is applicable to all microorganisms. However, it is presently preferred that the yeasts belong to the families Cryptococcaceae and Endomycetaceae, and that the molds be selected from the class Ascomycetes. The families Pseudomonadaceae, Corynebacteriaceae, Bacillaceae, Bacteriaceae, Acromobacteraceae, Brevibacteriaceae, Mycobacteriaceae, Actinomycetaceae, and Micrococcaceae, are appropriate for bacteria. Particularly preferred microorganisms are *Pseudomonas aeruginosa* (ATCC 21661), *Mycobacteridum smegmatis* (ATCC 21701), *Candida tropicalis* (ATCC 20336) and *Mycotorula japonica* (ATCC 20311). These strains have been deposited with the American Type Culture Collection, Rockville, Maryland, and are freely available to the public.

There has thus been outlined rather broadly the more important features of the invention in order that the detailed description thereof that follows may be better understood and in order that the present contribution to the art may be better appreciated.

A specific embodiment of the invention has been chosen for purposes of illustration and description, and is shown in the accompanying schematic drawing forming a part of the specification.

DESCRIPTION OF THE INVENTION

With reference to the drawing, the numeral 1 generally indicates a first fermenter and the numeral 7 generally indicates a second fermenter. Each fermenter is provided with a blower 2 and 8 respectively connected thereto by means of appropriate conduits to supply air for aeration of the cultures. Moreover, each fermenter is provided with appropriate stirring means 14.

Positioned between fermenter 1 and fermenter 7 is a product separation tank 3, a microorganism separation apparatus 4, product separation apparatus 5 and pump 6. Similarly, the same devices are positioned between fermenter 7 and fermenter 1 and are indicated by the numerals 9, 10, 12 and 11 respectively. As for the separation apparatus such as 3, 4, 5, 9, 10 and 12, appropriate means would include precipitation, membrane filter, centrifuge, and adsorption. Of course, any of the above-noted separation means may be deleted from the system in accordance with the desired end products to be separated.

Appropriate conduits generally indicated by the numeral 15, interconnect the respective fermenters and separation means. Each fermenter is also provided with an inlet conduit 20 for introduction of fresh medium and inoculate. Accordingly, fermenter 1 is connected to fermenter 7 and the latter is connected to the former by means of similar conduits thereby forming a closed system.

Initially, fermenters 1 and 7 are charged with suitable culture media A and B respectively. The culture medium may be either synthetic or natural and those having a composition normally used in the ordinary culture of yeasts, molds and bacteria can be used. However, a suitable amount of hydrocarbons or carbohydrates is added to the medium as the carbon source. The following culture medium compositions are given as representative of appropriate media and are used in the examples hereinafter given:

CULTURE MEDIUM COMPOSITION A:

| | g/l |
|---|---|
| $(NH_4)_2SO_4$ | 2.5 |
| $KH_2PO_4$ | 3.0 |
| $K_2HPO_4$ | 7.0 |
| $MgSO_4 \cdot 7H_2O$ | 0.1 |
| $CuSO_4 \cdot 5H_2O$ | $1 \times 10^{-4}$ |
| $FeCl_3 \cdot 6H_2O$ | $4 \times 10^{-4}$ |
| $MnSO_4 \cdot 7H_2O$ | $8 \times 10^{-4}$ |
| $NaMoO_4 \cdot H_2O$ | $4 \times 10^{-4}$ |
| $ZnSO_4 \cdot 7H_2O$ | $8 \times 10^{-4}$ |
| Vitamin solution (200 mg of riboflavin, 100 mg each of thiamine, p-aminobenzoic acid, pyridoxin hydrochloride, calcium pantothenate and nicotinic acid and one mg each of biotin and folic acid adjusted to one l) | 1 ml/l |
| Hydrocarbon (mixture of $n\text{-}C_{12}H_{26}$, $n\text{-}C_{13}H_{28}$, $n\text{-}C_{14}H_{30}$, $n\text{-}C_{15}H_{32}$ and $n\text{-}C_{16}H_{34}$) | 20 ml/l |
| The total volume is adjusted to 1000 ml with distilled water. | |

CULTURE MEDIUM COMOPOSITION B:

| | g/l |
|---|---|
| $NH_4H_2PO_4$ | 5.0 |
| $KH_2PO_4$ | 0.7 |
| $MgSO_4 \cdot 7H_2O$ | 0.4 |
| NaCl | 0.1 |
| $CaCl_2 \cdot 2H_2O$ | 0.1 |
| $CuSO_4 \cdot 5H_2O$ | $1 \times 10^{-4}$ |
| $FeCl_3 \cdot 6H_2O$ | $4 \times 10^{-4}$ |
| $MnSO_4 \cdot 7H_2O$ | $8 \times 10^{-4}$ |
| $NaMoO_4 \cdot H_2O$ | $4 \times 10^{-4}$ |
| $ZnSO_4 \cdot 7H_2O$ | $8 \times 10^{-4}$ |
| Vitamin solution (200 mg of riboflavin, 100 mg each of thiamine, p-aminobenzoic acid, pyridoxin hydrochloride, calcium pantothenate and nicotinic acid and one mg each of biotin and folic acid adjusted to one l) | 1 ml/l |
| Hydrocarbon (mixture of $n\text{-}C_{12}H_{26}$, $n\text{-}C_{13}H_{28}$, $n\text{-}C_{14}H_{30}$, $n\text{-}C_{15}H_{32}$ and $n\text{-}C_{16}H_{34}$) | 20 ml/l |
| The total volume is adjusted to 1000 ml with distilled water. | |

Example 1

In this example, a strain of *Pseudomonas aeruginosa* IFO 3929 (ATCC 21661) is inoculated into 20 l of medium A in fermenter 1 and a strain of *Candida lipolytica* NRRL Y-6795 is inoculated into 20 l of medium B in fermenter 7. Each of the fermenters has a capacity of 30 l. Culturing is carried out at 37°C for both fermenters 1 and 7 with agitation at 500 r.p.m. and aeration at a rate of 10.0 l/minute. During the culturing, the fresh media are properly supplied to the respective fermenters so that each medium-concentration may be maintained constant. The feed and effluent rates of the culture liquors including said fresh media to or from the respective fermenters reach a steady state at 6 l/hour.

As a result, the specific growth rate of the respective microorganisms is approximately 0.3 hour$^{-1}$, because the specific growth rate is equal to a dilution ratio (=flow rate/volume of medium) in the state of equilibrium in continuous culturing. Thus, in the present example, the specific growth rate is as follows:

Flow rate / volume of medium = 6/20 = 0.3 hour$^{-1}$

The result of mixed culturing of these microorganisms in a single tank as disclosed in my aforementioned patent application is such that the maximum specific growth rate of *Pseudomonas aeruginosa* IFO 3923 (ATCC 21661) is 0.341 hour$^{-1}$ and the maximum specific growth rate of *Candida lypolitica* NRRL Y-6795 is 0.326 hour$^{-1}$.

It is seen from the foregoing results that the same effect as in carrying out mixed culturing in a single tank can be obtained according to the recycle type, continuous fermentation process based on the present invention.

The maximum specific growth rate means the rate of propagation which equals the amount of cells produced (dry mass) per unit time per unit cell mass (dry mass) in a logarithmic propagation period.

Moreover, in the fermentation of the strain of *Pseudomonas aeruginosa* in fermenter 1 in the present example, biotin-related substances are produced and, after cells are separated in separator 4, the substances are adsorbed and separated in the adsorption column 5. Furthermore, in the fermentation of the strain of *Candida lypolitica* in fermenter 7, oil and fat and citric acid are produced; and after the resulting precipitates are settled and separated in separator 9, the cells were separated in separator 10 and other substances adsorbed in column 12. In this case, the rates of production of biotin, oil and fat and citric acid are 2.5, 3.5 and 8.2 g/l/hour, respectively, and these rates are higher than those of biotin, oil and fat and citric acid, 1.0, 1.4 and 3.6 g/l/hour, respectively, in single culturing of the respective microorganisms under the same conditions.

Example 2

In this example, a strain of *Corynebacterium hydrocarboclastus* (ATCC 15108) is cultured in the first fermenter 1, and a strain of *Candida tropicalis* PK 233 (ATCC 20336) in the second fermenter 7 in the same manner as in Example 1. The culturing temperature is 38°C for both tanks and feed and effluent rates of the culture liquor to and from the respective fermenters are 6 l/hour. Accordingly, the dilution ratio is 6/20 = 0.3 hour$^{-1}$, as calculated in the previous example, when the respective fermenters reach equilibrium. Thus, it is seen that the maximum specific growth rate is approximately 0.3 hour$^{-1}$.

The mixed culturing of these microorganisms in a single tank is carried out, which results in a maximum specific growth rate of *Corynebacterium hydrocarboclastus* (ATCC 15108) of 0.326 hour$^{-1}$ and the maximum specific growth rate of *Candida tropicalis* PK 233 (ATCC 20336) of 0.323 hour$^{-1}$.

It is seen from the foregoing result that even in the mixed culturing of these microorganisms, the same effect as in the mixed culturing in a single fermenter can be obtained.

In the present example, in the fermentation of *Corynebacterium hydrocarboclastus* in fermenter 1, glutamic acid is produced, and adsorbed and separated in the adsorption column 5. In the fermentation of *Candida tropicalis* in fermenter 7, coenzyme Q and ergosterol are produced, and these are adsorbed and separated in column 12. Other operating conditions are the same as in Example 1. The rates of production of glutamic acid, coenzyme Q and ergosterol are respectively 9.2, 2.0, and 2.2 g/l/hour in this case and the rates are higher than those of production of glutamic acid, coenzyme Q and ergosterol, 3.7, 0.7 and 0.8 g/l/hour, respectively, in the single culturing of the same microorganisms under the same conditions.

Example 3

In this example, a strain of *Mycobacterium smegmatis* IFO 3083 (ATCC 21701) is cultured in the first fermenter 1, and a strain of *Mycotorula japonica* IAM 4185 (ATCC 20311) is cultured in the second fermenter 7 in the same manner as in Example 1 except the culturing temperature is 36°C for each of the fermenters. The feed and effluent rates of the culture liquors to and from the respective fermenters are 6.2 l/hour. Accordingly, the dilution ratio is 6.2/20 = 0.31 hour$^{-1}$, when the respective fermenters reach equilibrium. Therefore, the maximum specific growth rate is approximately 0.31 hour$^{-1}$.

The mixed culturing of these microorganisms in a single fermenter is carried out, and the maximum specific growth rate of *Mycobacterium smegmatis* IFO 3083 (ATCC 21701) is 0.356 hour$^{-1}$ and the maximum specific growth rate of *Mycotorula japonica* IAM 4185 (ATCC 20311) is 0.341 hour$^{-1}$. Thus the culturing of these microorganisms in the present method has the same effect as in the simultaneous mixed culturing in a single fermenter.

In the present example, in the fermentation of *Mycobacterium smegmatis* in fermenter 1, carotinoids are produced, and are separated and recovered in separator 5. In this case, the rate of production of the carotinoids is 2.6 g/l/hour, and is higher than the rate of production of carotinoids, 1.2 g/l/hour, in the single culture of the same microorganisms under the same conditions.

What is claimed is:

1. A process for the continuous fermentation of microorganisms which comprises:

culturing a bacterium in a first fermenter in a culture medium containing carbohydrates or hydrocarbons as the assimilable carbon source;

culturing a microorganism selected from the group consisting of yeasts and molds in a second fermenter in a culture medium containing carbohydrates or hydrocarbons as the assimilable carbon source;

maintaining the culture temperature of said fermenters at about the optimum temperature for culturing bacterium;

separating the microorganism cells and selected metabolic products from the culture liquor of the fermenters when the specific growth rate of the microorganisms reaches a maximum and then continuously recycling the resulting culture, liquor from the first fermenter to the second fermenter and the resulting culture liquor from the second fermenter to the first fermenter. while supplying fresh media to said fermenters to maintain the concentration thereof constant.

2. The process of claim 1 wherein said bacterium belongs to the family Pseudomonadaceae, Corynebacteriaceae, Bacillaceae, Bacteriaceae, Acromobacteraceae, Brevibacteriaceae, Mycobacteriaceae, Actinomycetaceae or Micrococcaceae.

3. The process of claim 1 wherein said mold belongs to the class Ascomycetes and said yeast belongs to the family Cryptococcaceae or Endomycetaceae.

4. The process of claim 1 wherein said culturing temperature is 36° – 38°C.

5. The process of claim 2 wherein said bacterium is *Pseudomonas aeruginosa* (ATCC 21661).

6. The process of claim 2 wherein said bacterium is a strain of *Corynebacterium hydrocarboclastus*.

7. The process of claim 2 wherein said bacterium is *Mycobacterium smegmatis* (ATCC 21701).

8. The process of claim 3 wherein said yeast is *Candida tropicalis* (ATCC 20336).

9. The process of claim 3 wherein said yeast is a strain of *Candida lipolytica*.

10. The process of claim 3 wherein said mold is *Mycotorula japonica* (ATCC 20311).

11. Process according to claim 1 wherein said maximum growth rate of said microorganisms is maintained by controlling the feed and effluent rates of said culture liquors including the introduction of fresh media to maintain a dilution ratio of from 0.2 – 0.4 hour$^{-1}$.

* * * * *